US010307841B2

(12) United States Patent
Yoshinari et al.

(10) Patent No.: US 10,307,841 B2
(45) Date of Patent: Jun. 4, 2019

(54) POWER TOOL

(71) Applicant: Hitachi Koki Co., Ltd., Tokyo (JP)

(72) Inventors: Takuya Yoshinari, Hitachinaka (JP);
Kazuhiko Funabashi, Hitachinaka (JP);
Toshiaki Koizumi, Hitachinaka (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 15/554,517

(22) PCT Filed: Feb. 26, 2016

(86) PCT No.: PCT/JP2016/055843
§ 371 (c)(1),
(2) Date: Aug. 30, 2017

(87) PCT Pub. No.: WO2016/158133
PCT Pub. Date: Oct. 6, 2016

(65) Prior Publication Data
US 2018/0071843 A1 Mar. 15, 2018

(30) Foreign Application Priority Data

Mar. 31, 2015 (JP) ................. 2015-072457

(51) Int. Cl.
*B25F 5/00* (2006.01)
*B25F 5/02* (2006.01)
(Continued)

(52) U.S. Cl.
CPC ............... *B23D 47/12* (2013.01); *B25F 5/00* (2013.01); *B25F 5/02* (2013.01); *H02K 7/145* (2013.01);
(Continued)

(58) Field of Classification Search
CPC ....................................................... H02P 6/28
(Continued)

(56) References Cited

U.S. PATENT DOCUMENTS 4,709,317 A   11/1987 Iizuka et al.
7,233,124 B2 * 6/2007 Takeoka ................. H02P 23/06
                                                          318/376
(Continued)

FOREIGN PATENT DOCUMENTS

EP   2471633 A2    7/2012
JP   62-068095 A   3/1987
(Continued)

OTHER PUBLICATIONS

International Report on Patentability for application PCT/JP2016/055843 (dated Oct. 12, 2017), 8 pages.
(Continued)

*Primary Examiner* — David Luo
(74) *Attorney, Agent, or Firm* — Kilpatrick Townsend & Stockton LLP

(57) ABSTRACT

A power tool includes: a brushless motor; a rectifier circuit; a smoothing circuit; an inverter; a controller; an operating part; and a switch. The switch is rendered ON in accordance with an operation performed in the operating part by a user to allow power to be supplied to the inverter circuit by the rectifier circuit through the smoothing circuit and rendered OFF in accordance with release of the operation by the user to interrupt the inverter circuit from the rectifier circuit to halt supplying the power to the inverter circuit. The smoothing circuit includes a first capacitor and a second capacitor connected in parallel. The controller is configured to control the switching operations of the inverter circuit to drive the brushless motor in accordance with a signal inputted in accordance with the operation performed in the operating part by the user.

19 Claims, 7 Drawing Sheets

(51) Int. Cl.
*H02K 7/14* (2006.01)
*H02P 6/28* (2016.01)
*B23D 45/16* (2006.01)
*B23D 47/12* (2006.01)
*H02P 27/06* (2006.01)

(52) U.S. Cl.
CPC ............... *H02P 6/28* (2016.02); *H02P 27/06* (2013.01); *B23D 45/16* (2013.01); *Y02P 70/187* (2015.11)

(58) Field of Classification Search
USPC .................... 318/400.22, 400.21, 400.01
See application file for complete search history.

(56) References Cited

U.S. PATENT DOCUMENTS

| | | | | |
|---|---|---|---|---|
| 7,292,004 | B2* | 11/2007 | Ueda | H02M 1/425 |
| | | | | 318/801 |
| 8,283,880 | B2* | 10/2012 | Iwashita | H02M 7/797 |
| | | | | 318/362 |
| 2006/0208687 | A1 | 9/2006 | Takeoka et al. | |
| 2013/0264986 | A1 | 10/2013 | Niwa et al. | |

FOREIGN PATENT DOCUMENTS

| | | |
|---|---|---|
| JP | 06-022580 A | 1/1994 |
| JP | 2003-230786 A | 8/2003 |
| JP | 2006-109624 A | 4/2006 |
| JP | 2009-189241 A | 8/2009 |
| JP | 2012-196725 A | 10/2012 |
| JP | 2013-219875 A | 10/2013 |
| JP | 2014-103703 A | 6/2014 |
| JP | 2014-104536 A | 6/2014 |
| JP | 2014-133302 A | 7/2014 |
| JP | 2014-240120 A | 12/2014 |
| JP | 2015-009316 A | 1/2015 |
| WO | WO2012127851 A2 | 9/2012 |

OTHER PUBLICATIONS

International Search Report for international application PCT/JP2016/055843 (dated Apr. 26, 2016), 10 pages.

European Patent Office Extended Search for EP16772017.6 dated Nov. 21, 2018, 7 pages.

Japan Patent Office Notification of Reasons of Refusal for patent application JP2017-218315 (dated Sep. 13, 2018), 6 pages with translation.

* cited by examiner

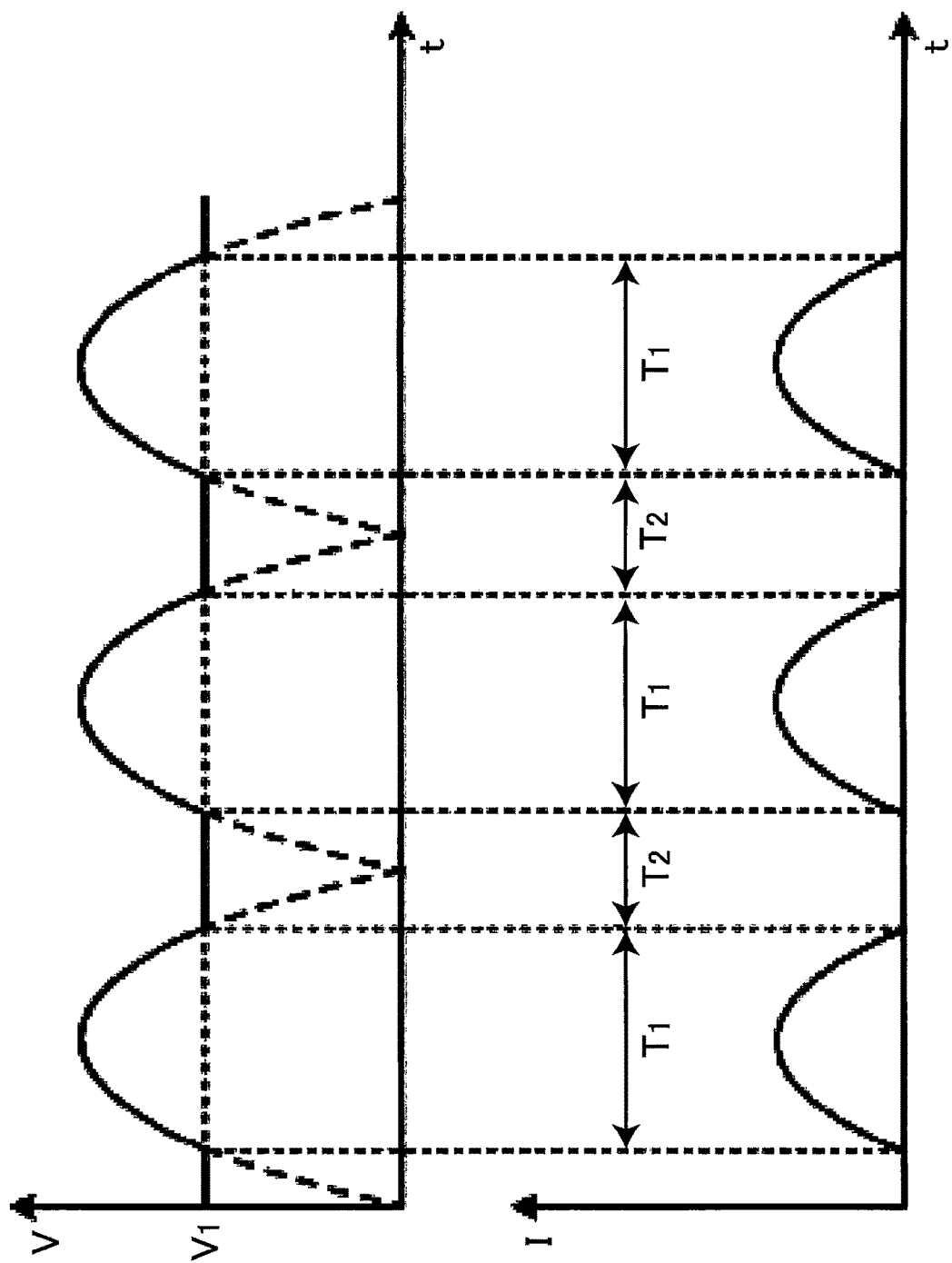

POWER TOOL

TECHNICAL FIELD

The present invention relates to a power tool that is powered by a brushless motor.

BACKGROUND ART

A conventional compact power tool known in the art is powered by a brushless motor and provided with a smoothing capacitor having a small capacitance disposed between a rectifier circuit for rectifying the AC voltage and an inverter circuit for supplying the voltage to the brushless motor (for example, refer to Patent Literature 1 shown below).

CITATION LIST

Patent Literature

[PTL 1]
Japanese Patent Application Publication No. 2012-196725

SUMMARY OF INVENTION

Technical Problem

In recent years there has been much demand for power tools that are compact but produce high output. However, practical work performed in load ranges that are heavier than normal may produce high peak values of electric current (i.e., peak currents) in a high output power tool. High peak currents can cause various issues including damage to switching elements mounted on the inverter circuit, as well as damage to the motor, switch, and other components. High peak currents may also trigger an overcurrent protection circuit provided in the dynamo, i.e., the power supply, or the power tool itself to halt the drive of the tool.

One way to suppress peak currents is to use a smoothing capacitor with a larger capacitance, but this would increase the size of the tool body.

In view of the foregoing, it is an object of the present invention to provide a power tool capable of suppressing peak currents without increasing the size of the tool body. It is another object of the present invention to provide a power tool capable of suppressing peak currents without increasing the size of the tool body and capable of extending the life of the product.

Solution to Problem

In order to attain the above and other objects, the present invention provides a power tool that includes a brushless motor; a rectifier circuit; a smoothing circuit; and an inverter circuit. The rectifier circuit is configured to rectify an AC voltage and output a rectified voltage. The smoothing circuit is configured to smooth the rectified voltage and output a smoothed voltage. The inverter circuit is configured to supply the smoothed voltage to the brushless motor while performing switching actions with respect to the smoothed voltage. The smoothing circuit comprises a first capacitor and a second capacitor. The first capacitor and the second capacitor have different impedance and are connected in parallel.

By providing two capacitors having different impedance in the smoothing circuit, this configuration can effectively suppress peak currents in a high output power tool, without increasing the size of the tool body. Thus, this construction can supply a stable voltage to the brushless motor, improving tool performance.

It is preferable that the first capacitor is a polarized capacitor and the second capacitor is a non-polarized capacitor in the power tool described above.

Since polarized capacitors have a large capacitance for their size, this configuration can produce the required capacitance without increasing the size of the tool body. Further, since non-polarized capacitors have a good capacity for absorbing the high frequency component, this configuration can suppress instantaneous peak currents.

Further, it is preferable that the polarized capacitor is an electrolytic capacitor, and the non-polarized capacitor is a file capacitor.

By providing a film capacitor in addition to an electrolytic capacitor, this configuration can effectively suppress peak currents.

It is preferable that the first capacitor has a capacity larger than a capacity of the second capacitor.

By providing two capacitors having different capacity in the smoothing circuit, this configuration can effectively suppress peak currents.

It is preferable that in the power tool described above, the brushless motor has stator windings from which induced voltage is generated, and the smoothing circuit outputs a pulsating voltage having a minimum value smaller than the induced voltage.

With this configuration, the capacitors in the smoothing circuit have a small capacitance that does not smooth output from the rectifier circuit completely. Rather, the smoothing circuit outputs a pulsating voltage whereby electric current flows to the brushless motor during periods in which the output voltage of the smoothing circuit is higher than the induced voltage generated in the stator windings and does not flow to the brushless motor in periods in which the output voltage of the smoothing circuit is lower than the induced voltage. Accordingly, this arrangement allows for a compact smoothing circuit that suppresses an increase in the size of the power tool body.

Further, it is preferable that the power tool further includes an operating part; and a switch. The operating part is operable by a user. The switch is interposed between the rectifier circuit and the inverter circuit and rendered ON and OFF in accordance with an operation performed in the operating part. The switch is interposed between the first capacitor and the inverter circuit.

With this configuration, the output current from the rectifier circuit passes through the first capacitor before being inputted into the switch. Therefore, even if an inrush current is generated as the brushless motor is started, the first capacitor can suppress peaks in the current, preventing the inrush current from being inputted directly into the switch. Thus, this configuration can prevent the switch from becoming welded or the like, improving the service life of the switch and tool.

It is preferable that the switch is interposed between the first capacitor and the second capacitor, and the second capacitor is interposed between the switch and the inverter circuit.

In this configuration, since the second capacitor is provided between the switch and the inverter circuit, voltage surges in the inverter circuit can be suppressed when the switch is turned off. Therefore, this configuration can prevent damage to MOSFET, IGBT, and other switching elements mounted on the inverter circuit, and to the brushless motor and the like.

Further, it is preferable that the power tool further includes control means; and a signal outputting part. The control means is for controlling switching operations of the inverter circuit. The signal outputting part is configured to output an ON/OFF signal to the control means in accordance with operations performed in the operating part.

This configuration can ensure good operability, since the drive of the brushless motor can be reliably started and stopped by operating the operating part.

It is preferable that when the control means determines that a current value flowing in the brushless motor exceeds a threshold value, the control means controls the inverter circuit to stop the switching operations regardless of the operations performed in the operating part.

This configuration can prevent the brushless motor from burning out due to overcurrent, thereby improving the service life of the tool.

It is preferable that the power tool further includes a circuit board. Circuit elements including the rectifier circuit, the smoothing circuit, and the inverter circuit are mounted on the circuit board. The circuit board has planar dimensions. The circuit elements have heights. The first capacitor and the second capacitor are electrically connected to the circuit board, positioned within the planar dimensions of the circuit board, and have heights substantially equivalent to the heights of the circuit elements.

By arranging small capacitors on or near the circuit board, this construction can achieve a compact power tool.

According to another aspect, the present invention provides a power tool that includes: a brushless motor; a rectifier circuit; a smoothing circuit; and an inverter circuit. The rectifier circuit is configured to rectify an AC voltage and output a rectified voltage. The smoothing circuit is configured to smooth the rectified voltage and output a smoothed voltage. The inverter circuit is configured to supply the smoothed voltage to the brushless motor while performing switching actions with respect to the smoothed voltage. The smoothing circuit includes two capacitors and a switch. The two capacitors are connected in parallel. The switch is interposed between the two capacitors.

In this configuration, a capacitor is provided between the rectifier circuit and switch so that the output current from the rectifier circuit passes through the capacitor before being inputted into the switch. Accordingly, if an inrush current occurs when the brushless motor is started, the capacitor can suppress peaks in the current, preventing the inrush current from being inputted directly into the switch. Therefore, this configuration can prevent the switch from becoming welded and the like, improving the service life of the switch and of the tool. Further, the capacitor provided between the switch and the inverter circuit can suppress voltage surges in the inverter circuit when the switch is turned off. Hence, this configuration can prevent damage to MOSFET, IGBT, and other switching elements mounted on the inverter circuit, and to the brushless motor and the like, thereby improving the service life of the product.

It is preferable that the capacitors are film capacitors in the power tool described above.

By providing two film capacitors in the smoothing circuit, this configuration can effectively suppress peak currents.

Further, it is preferable that the brushless motor has stator windings from which an induced voltage is generated. The smoothing circuit outputs a pulsating voltage having a minimum value smaller than the induced voltage.

With this configuration, the capacitors in the smoothing circuit have a small capacitance that does not smooth output from the rectifier circuit completely. Rather, the smoothing circuit outputs a pulsating voltage whereby electric current flows to the brushless motor during periods in which the output voltage of the smoothing circuit is higher than the induced voltage generated in the stator windings and does not flow to the brushless motor in periods in which the output voltage of the smoothing circuit is lower than the induced voltage. Accordingly, this arrangement allows for a compact smoothing circuit that suppresses an increase in the size of the power tool body.

Further, it is preferable that the power tool further includes an operating part. The operating part is operable by a user. The switch is rendered ON and OFF in accordance with an operation performed in the operating part.

This configuration can ensure good operability, since the drive of the brushless motor can be reliably started and stopped by operating the operating part.

Further, it is preferable that the power tool further includes control means; and a signal outputting part. The control means is for controlling switching operations of the inverter circuit. The signal outputting part is configured to output an ON/OFF signal to the control means in accordance with operations performed in the operating part.

This configuration can ensure good operability, since the drive of the brushless motor can be reliably started and stopped by operating the operating part.

It is preferable that when the control means determines that a current value flowing in the brushless motor exceeds a threshold value, the control means controls the inverter circuit to stop the switching operations regardless of the operations performed in the operating part.

This configuration can prevent the brushless motor from burning out due to overcurrent, thereby improving the service life of the tool.

Advantageous Effects of Invention

The power tool according to one aspect of the present invention can suppress peak currents without increasing the size of the tool body. Further, the power tool according to another aspect of the present invention can suppress peak currents without increasing the size of the tool body and can extend the life of the product.

BRIEF DESCRIPTION OF DRAWINGS

FIG. 5 is an explanatory diagram showing changes in an output voltage from a smoothing circuit and current flowing to an inverter circuit over time, in which FIG. 5A shows changes in the output voltage from the smoothing circuit over time, and FIG. 5B shows changes in the current flowing to the inverter circuit over time;

DESCRIPTION OF EMBODIMENTS

Figure 1:
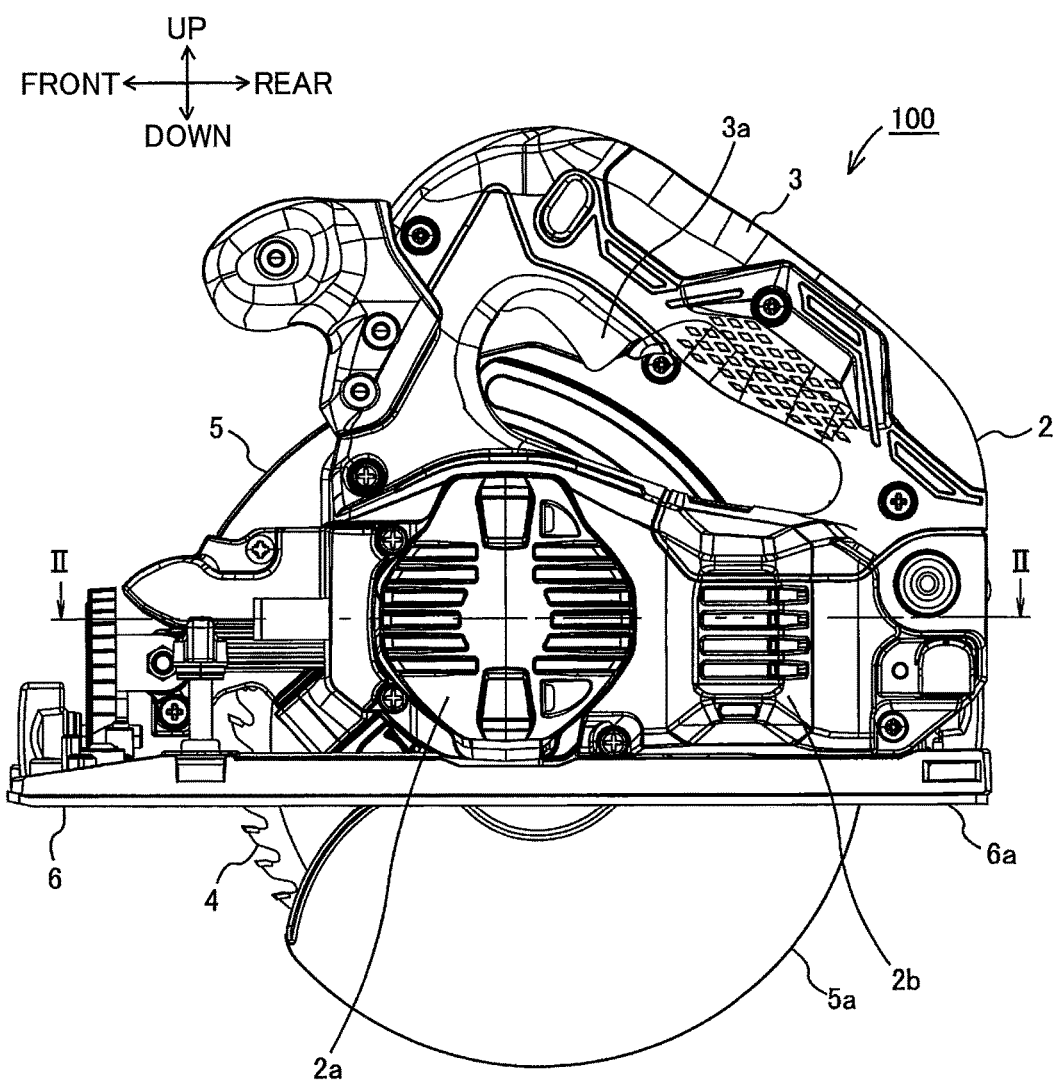
FIG. 1 is a side view showing an external appearance of an electric circular saw according to one embodiment.

The present invention will be described below with reference to the drawings on the basis of embodiments. Here, the present invention has been applied to an electric circular saw in the following description as an example. Identical or equivalent components, members, and the like illustrated in the drawings will be designated with the same reference numerals, and duplicative descriptions will be omitted as appropriate. In addition, the embodiments are not intended to limit the scope of the present invention, but exemplify the invention. All of the features and the combinations thereof described in the embodiments are not necessarily essential to the invention.

Figure 2:
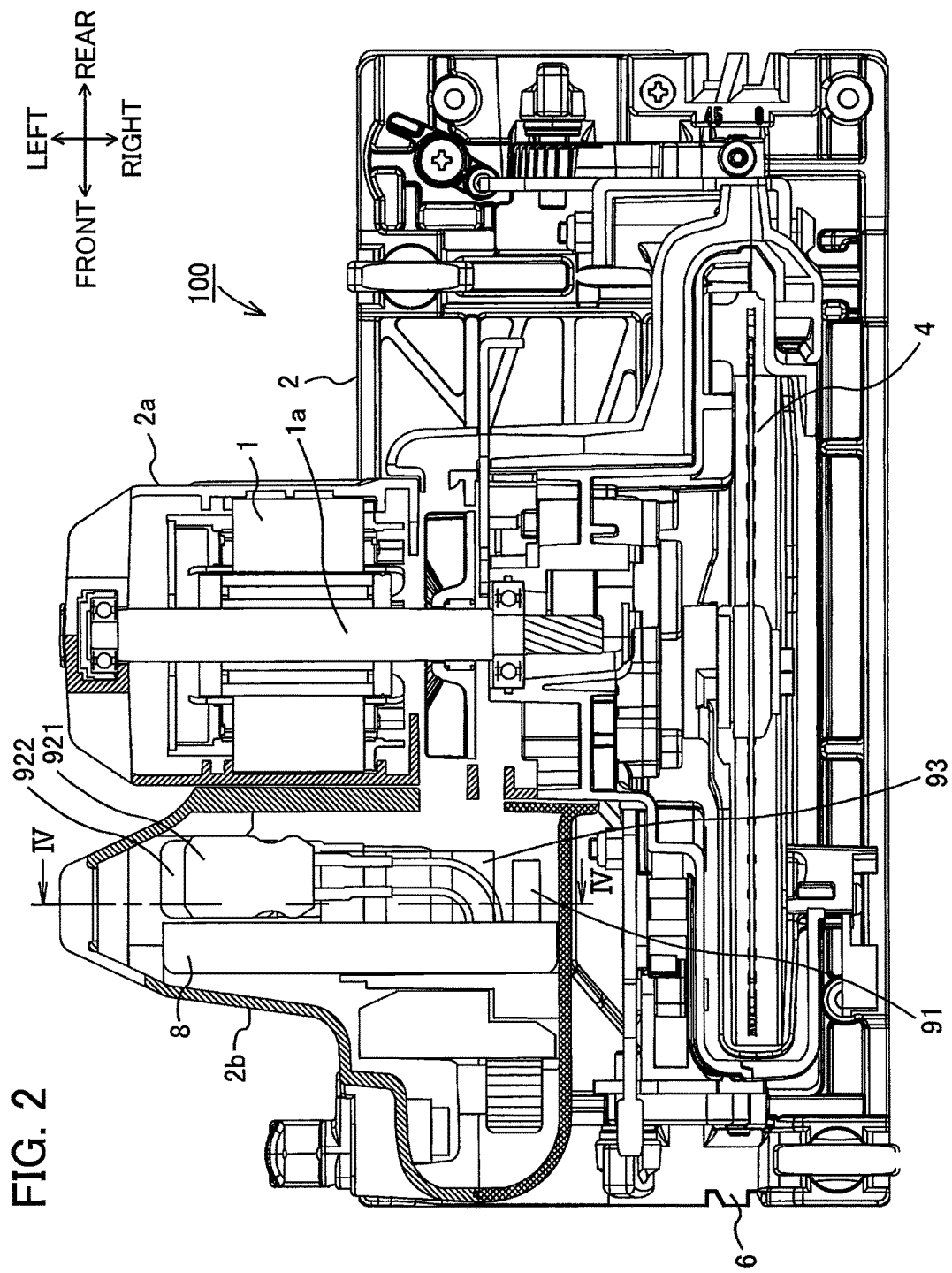
FIG. 2 is a plan view showing an interior of a housing for the electric circular saw according to the embodiment.

First, the structure of the electric circular saw according to one embodiment of the present invention will be described with reference to FIGS. 1 and 2. FIG. 1 is a side view showing the external appearance of the electric circular saw according to the embodiment. FIG. 2 is a plan view showing the interior of a housing for the electric circular saw according to the embodiment. The electric circular saw 100 according to the embodiment is provided with a housing 2, a handle 3, a saw blade 4, a blade cover 5, and a base 6. The electric circular saw 100 is a tool that cuts a workpiece, such as lumber, with the rotating saw blade 4 while the base 6 is slid over the workpiece. For the convenience of description, "front" indicated in the drawings defines the forward direction, "rear" defines the rearward direction, "up" defines the upward direction, and "down" defines the downward direction. The rightward direction and leftward direction are defined as directions toward the "right" and "left" sides of the electric circular saw 100, respectively, when viewing the electric circular saw 100 from the rear side of the same.

In the electric circular saw 100, the housing 2 is formed of a resin material, for example. A motor 1 and a control board 8 are accommodated in the housing 2. An electrical cord not shown in the drawings is provided in the housing 2 for connecting the electric circular saw 100 to a commercial AC power supply, dynamo, or the like.

The motor 1 is a brushless motor and is the drive source that drives the saw blade 4 to rotate. As shown in FIG. 2, the motor 1 is accommodated in a motor accommodating section 2a. The motor accommodating section 2a is defined in a left central area inside the housing 2. The motor 1 has a rotational shaft 1a whose axial direction is oriented in the left-right direction.

The control board 8 is accommodated in a circuit board accommodating section 2b defined in a left rear area inside the housing 2. The control board 8 is disposed so that the flat surfaces of the control board 8 are substantially parallel to the axial direction of the rotational shaft 1a. A control unit (described later) is mounted on the control board 8 for controlling the operations of the motor 1. The control board 8 corresponds to the circuit board of the present invention.

The handle 3 is a part that the user grips when using the electric circular saw 100. The handle 3 is provided integrally with the housing 2 or is a separate member that is coupled with the housing 2. As shown in FIG. 1, a trigger 3a is provided on the handle 3 for controlling the drive of the motor 1. The trigger 3a is electrically connected to both a switch (described later) inside the handle 3, and the control board 8 inside the housing 2. When the user pushes the trigger 3a upward, a start signal (ON signal) for starting the motor 1 is outputted to the switch and the control board 8. The trigger 3a corresponds to the operating part and the signal outputting part of the present invention.

The saw blade 4 has a disc shape. The saw blade 4 is rotatably supported coaxially with the rotational shaft 1a of the motor 1 on the right side of the housing 2.

The blade cover 5 is formed of metal, for example, and has an arcuate shape in a side view that follows the outer edge of the saw blade 4. The blade cover 5 is disposed on the right side of the housing 2 and covers the approximate upper half of the saw blade 4. The blade cover 5 is also provided with a protective cover 5a. The protective cover 5a is formed of a resin material, for example. The protective cover 5a is rotatably provided on the rear side of the blade cover 5 along the outer edge of the saw blade 4. When the electric circular saw 100 is not performing a cutting operation, the protective cover 5a covers the lower half portion of the saw blade 4, excluding a portion on the front side.

The base 6 is a plate formed of aluminum or other metal in a general rectangular shape, for example. The base 6 is coupled to the housing 2 via the blade cover 5. The longitudinal direction of the base 6 is aligned with the cutting direction of the electric circular saw 100, that is, the front-rear direction in FIGS. 1 and 2. The base 6 has a bottom surface 6a. The bottom surface 6a is the surface that slides over the workpiece. An open area not shown in the drawings is formed in the base 6. The open area penetrates the base 6 vertically and is elongated in the front-rear direction. The bottom portion of the saw blade 4 protrudes below the bottom surface 6a through this open area.

Figure 3:
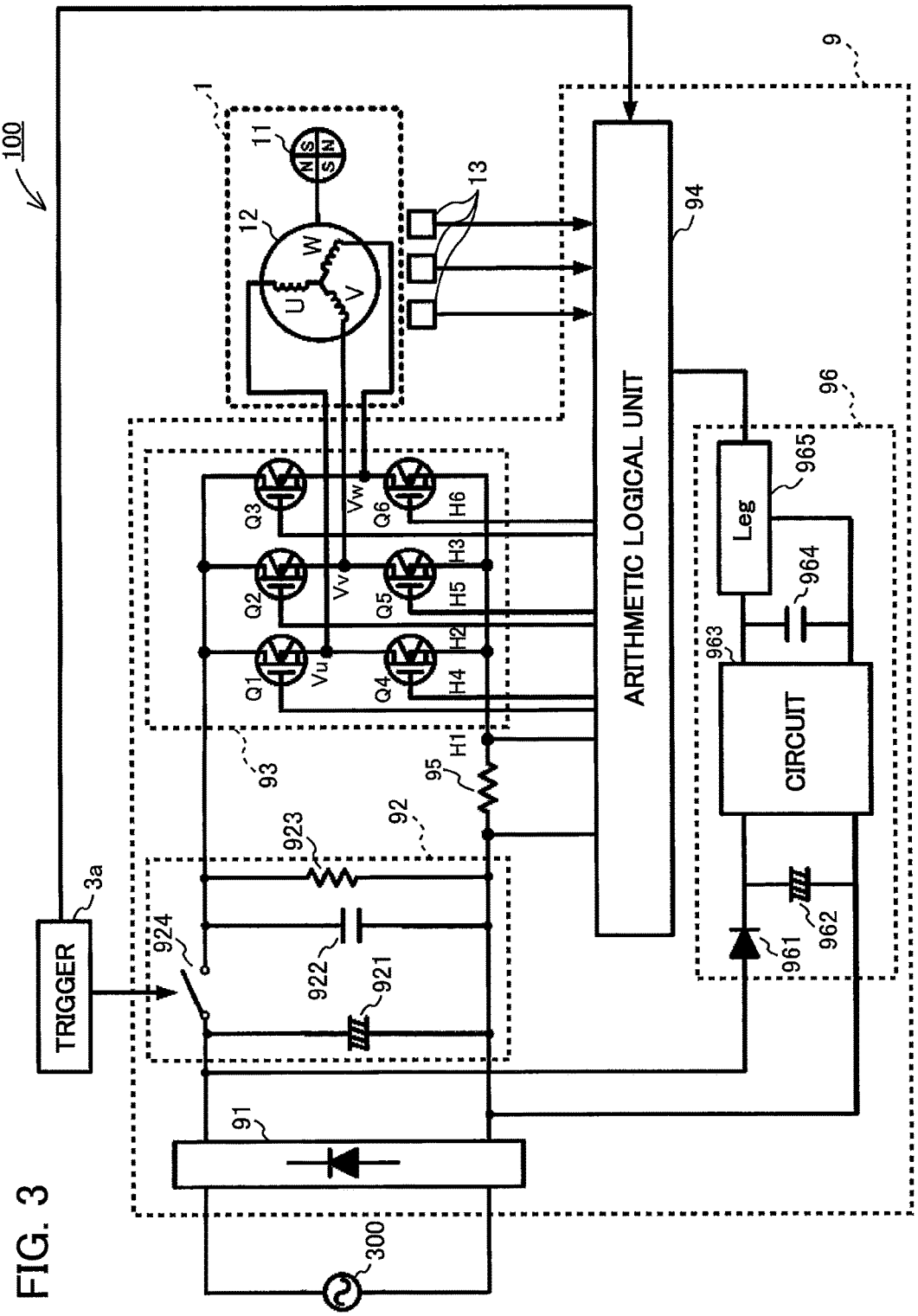
FIG. 3 is a circuit diagram showing an electrical structure of the electric circular saw according to a first embodiment.

Next, the circuit configuration of the electric circular saw 100 according to the first embodiment will be described. FIG. 3 is a circuit diagram showing the electrical structure of the electric circular saw 100 according to the first embodiment. As shown in FIG. 3, the electric circular saw 100 is configured to include the motor 1, the trigger 3a, and a control unit 9.

The motor 1 is configured of a three-phase brushless motor in the present embodiment. The motor 1 includes a rotor 11 provided with the rotational shaft 1a (see FIG. 2) and a plurality of permanent magnets, and a stator 12 disposed at a position confronting the rotor 11.

The rotor 11 is configured to include two pairs of permanent magnets, each pair having an N pole and an S pole. Three magnetic sensors 13 are arranged in a position confronting the permanent magnets in the rotor 11. The magnetic sensors 13 may be Hall effect sensors, for example, that detect the rotated position of the rotor 11 and output a position signal to the control unit 9.

The stator 12 is configured with three phase windings U, V, and W that are star-connected. The windings U, V, and W are connected to the control board 8. When the rotor 11 rotates in this motor 1, an induced voltage is generated in the windings U, V, and W of the stator 12.

Figure 4:
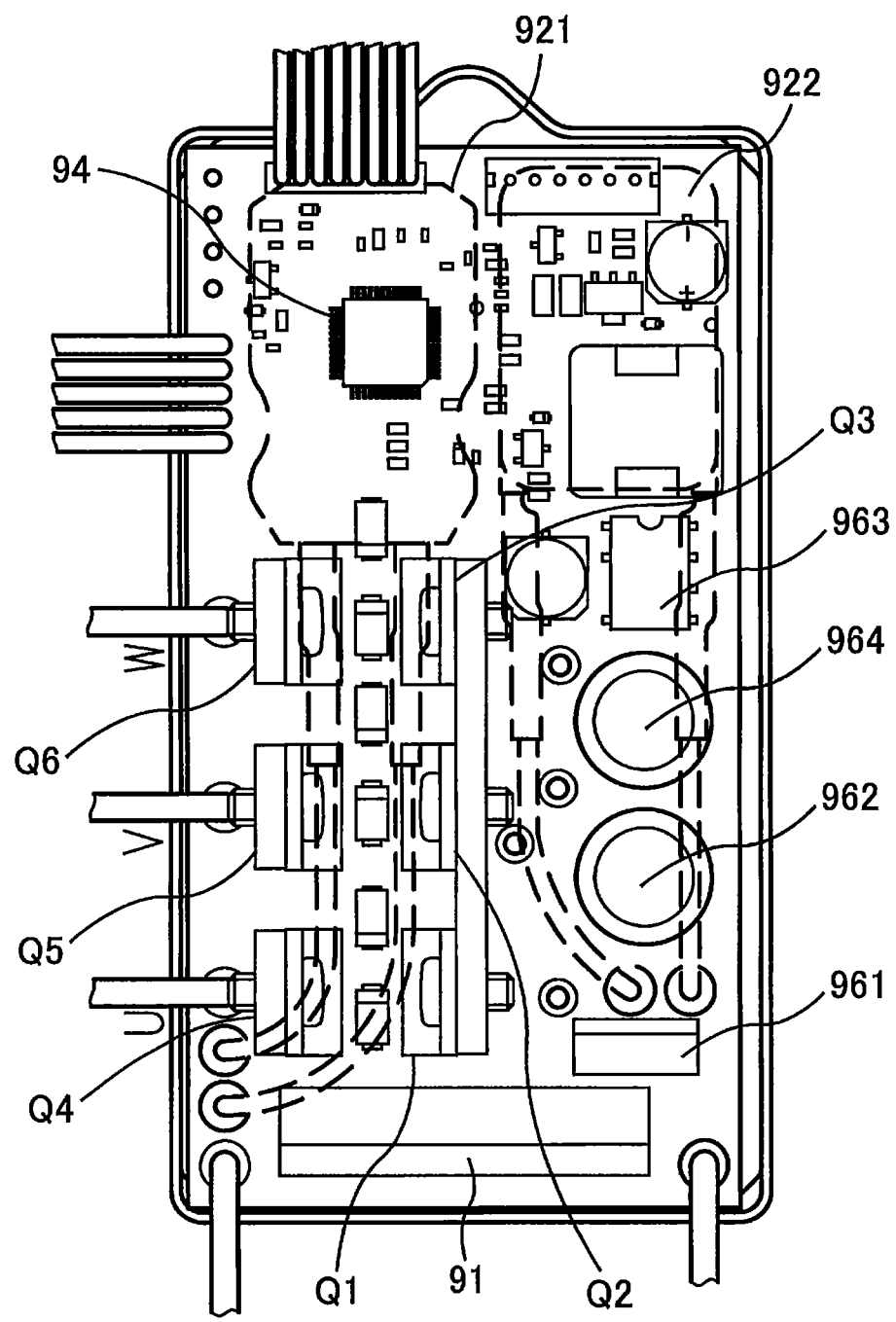
FIG. 4 is a plan view of the control board and a cross-sectional view along a line IV-IV in FIG. 1.

As shown in FIG. 3, the control unit 9 includes a rectifier circuit 91, a smoothing circuit 92, an inverter circuit 93, an arithmetic logical unit 94, a current detecting resistor 95, and a constant-voltage power supply circuit 96. Of these, the rectifier circuit 91, inverter circuit 93, arithmetic logical unit 94, and constant-voltage power supply circuit 96 are mounted on the control board 8. FIG. 4 is a plan view of the control board 8. As shown in FIG. 4, a plurality of circuit elements is arranged on the flat surface of the control board 8 so as to protrude outward therefrom.

The rectifier circuit 91 is a diode bridge circuit. As shown in FIG. 3, the input side of the rectifier circuit 91 is connected to a commercial AC power supply 300, for example, while the output side is connected to the smoothing circuit 92. The rectifier circuit 91 performs full-wave rectification of the AC voltage inputted from the commercial AC power supply 300 and outputs the rectified voltage to the smoothing circuit 92. As shown in FIG. 4, the rectifier circuit 91 is mounted on the control board 8.

As shown in FIG. 3, the smoothing circuit 92 is disposed between the rectifier circuit 91 and inverter circuit 93. The smoothing circuit 92 smoothes the voltage inputted from the rectifier circuit 91 and outputs the resulting voltage to the inverter circuit 93. In the present embodiment, the smoothing circuit 92 includes an electrolytic capacitor 921, a film capacitor 922, a discharge resistor 923, and a switch 924.

The electrolytic capacitor 921 is a polarized capacitor. As shown in FIG. 3, the electrolytic capacitor 921 is connected to the side of the smoothing circuit 92 receiving input from the rectifier circuit 91. The electrolytic capacitor 921 corresponds to the first capacitor of the present invention. In the present embodiment, the electrolytic capacitor 921 is a small capacitor with a capacitance of 150-200 µF.

As shown in FIG. 2, the electrolytic capacitor 921 is disposed in the space between the control board 8 and the front part of the circuit board accommodating section 2b and is connected to the control board 8. At this time, the electrolytic capacitor 921 is positioned within the planar dimensions of the control board 8, as indicated by the dashed line in FIG. 4. Further, the height dimension of the electrolytic capacitor 921 (the dimension in the front-rear direction of the electric circular saw 100) is approximately equivalent to the protruding lengths of circuit elements that protrude from the control board 8, as illustrated in FIG. 2.

The film capacitor 922 is a non-polarized capacitor. As shown in FIG. 3, the film capacitor 922 is connected in parallel to the electrolytic capacitor 921 and is disposed on the inverter circuit 93 side of the smoothing circuit 92 between the rectifier circuit 91 on the input side of the smoothing circuit 92 and the inverter circuit 93 receiving output from the smoothing circuit 92. The film capacitor 922 corresponds to the second capacitor of the present invention. In the present embodiment, the film capacitor 922 is a small capacitor having a capacitance of 4.7 µF.

As shown in FIG. 2, the film capacitor 922 is disposed in the space between the control board 8 and the front part of the circuit board accommodating section 2b and is connected to the control board 8. At this time, the film capacitor 922 is accommodated within the planar dimensions of the control board 8, as illustrated by a dashed line in FIG. 4. Further, the height dimension of the film capacitor 922 (the dimension in the front-rear direction of the electric circular saw 100) is approximately equivalent to the height dimension of the electrolytic capacitor 921 and the protruding lengths of the circuit elements that protrude from the control board 8, as illustrated in FIG. 2.

The switch 924 is disposed between the electrolytic capacitor 921 and film capacitor 922. The switch 924 is toggled on when a start signal is inputted from the trigger 3a, and is toggled off when input of the start signal is halted or when a halt signal (OFF signal) is inputted. In the electric circular saw 100 according to the present embodiment, the switch 924 is accommodated inside the handle 3 (not shown in the drawings).

The inverter circuit 93 includes six switching elements Q1-Q6 connected in a three-phase bridge circuit. Here, the switching elements Q1-Q6 may be MOSFETs (metal oxide semiconductor field effect transistors) or IGBTs (insulated gate bipolar transistors), for example. As shown in FIG. 4, the switching elements Q1-Q6 are mounted on the control board 8. As shown in FIG. 3, the inverter circuit 93 is connected to the output side of the smoothing circuit 92. Power for driving the motor 1 is supplied to the windings U, V, and W through switching operations performed on the switching elements Q1-Q6.

The arithmetic logical unit 94 corresponds to the controlling means of the present invention. In the present embodiment, the arithmetic logical unit 94 is a microcomputer. As shown in FIG. 4, the arithmetic logical unit 94 is mounted on the control board 8. The arithmetic logical unit 94 controls the direction and duration at which electricity is conducted to the windings U, V, and W on the basis of a start signal inputted in response to the operation of the trigger 3a in order to control such aspects as the rotational speed and direction of the motor 1. The arithmetic logical unit 94 is connected to each gate of the six switching elements Q1-Q6 in the inverter circuit 93 and supplies drive signals H1-H6 for switching the switching elements Q1-Q6 on and off.

Here, the drain or source of each of the switching elements Q1-Q6 in the inverter circuit 93 is connected to one of the windings U, V, and W in the motor 1. The switching elements Q1-Q6 execute switching operations on the basis of the drive signals H1-H6 inputted from the arithmetic logical unit 94 to relay the voltage supplied from the commercial AC power supply 300 to the windings U, V, and W of the motor 1 via the rectifier circuit 91 and smoothing circuit 92 as drive voltages Vu, Vv, and Vw in three phases (U phase, V phase, and W phase).

The current detecting resistor 95 is a resistor that detects current flowing to the motor 1 and inverter circuit 93. As shown in FIG. 3, the current detecting resistor 95 is connected between the smoothing circuit 92 and inverter circuit 93.

By measuring the voltage at both ends of the current detecting resistor 95, the arithmetic logical unit 94 detects the value of current flowing to the motor 1 and inverter circuit 93. A prescribed threshold value is preset in the arithmetic logical unit 94. When the detected value of current exceeds the threshold value, the arithmetic logical unit 94 halts switching operations in the inverter circuit 93 in order to stop driving the motor 1. This action prevents the occurrence of burnout and the like caused by overcurrent flowing to the motor 1.

As shown in FIG. 3, the constant-voltage power supply circuit 96 is connected to the output side of the rectifier circuit 91. The constant-voltage power supply circuit 96 includes a diode 961, a capacitor 962, an IPD circuit 963, a capacitor 964, and a regulator 965. The constant-voltage power supply circuit 96 serves to supply a stable reference voltage to the arithmetic logical unit 94 and the like on the basis of output from the rectifier circuit 91. The components of the constant-voltage power supply circuit 96 are mounted on the control board 8, as illustrated in FIG. 4.

Next, the smoothing circuit 92 of the electric circular saw 100 according to the embodiment will be described in greater detail.

FIG. 5 is an explanatory diagram showing changes in an output voltage from the smoothing circuit 92 and current flowing to the inverter circuit 93 over time. FIG. 5A shows changes in the output voltage from the smoothing circuit 92 over time, where the vertical axis represents the output voltage V of the smoothing circuit 92 and the horizontal axis represents time t. FIG. 5B shows changes in the current flowing to the inverter circuit 93 over time, where the vertical axis represents the current I flowing to the inverter circuit 93 and the horizontal axis represents time t. This current I is detected by measuring the voltage at both ends of the current detecting resistor 95.

The voltage that the rectifier circuit 91 inputs into the smoothing circuit 92 is high because the electric circular saw 100 requires a larger output than other power tools (such as an impact driver, for example). However, the electrolytic capacitor 921 and film capacitor 922 provided in the smoothing circuit 92 are both compact and have small capacitances in the electric circular saw 100 according to the present embodiment. Accordingly, the voltage inputted from the rectifier circuit 91 into the smoothing circuit 92 is not completely smoothed. As shown in FIG. 5A, the smoothing circuit 92 outputs a pulsating voltage V whose voltage value has a periodic variation. Here, the pulsating voltage V has the frequency of the commercial AC power supply 300 (utility frequency).

The pulsating voltage outputted from the smoothing circuit 92 is supplied to the motor 1 through the inverter circuit 93. The voltage supplied to the motor 1 drives the rotor 11 to rotate. At this time, an induced voltage $V_1$ is generated in the windings of the stator 12.

As shown in FIG. 5A, the pulsating voltage V outputted from the smoothing circuit 92 has a minimum value smaller than the induced voltage $V_1$ generated in the windings. Accordingly, while current flows to the inverter circuit 93 (I>0) during periods $T_1$ in which the value of the pulsating voltage V is greater than the induced voltage $V_1$, current does not flow (I=0) during periods $T_2$ in which the value of the pulsating voltage V is less than or equal to the induced voltage $V_1$. Hence, the waveform of the current I flowing to the inverter circuit 93 is macroscopically similar in shape to the waveform of the pulsating voltage V in periods $T_1$. That is, the current I is, macroscopically, a pulsating current having the utility frequency of the commercial AC power supply 300.

However, since the motor 1 is driven to rotate in the periods $T_1$ during which current flows to the inverter circuit 93 and motor 1, the motor 1 continues to rotate due to inertia during periods $T_2$ in which no current flows. When periods $T_1$ during which V>V1 occur regularly so that the motor 1 is driven periodically, the motor 1 can continue to rotate during both periods $T_1$ in which current is flowing and periods $T_2$ in which current is not flowing.

Figure 6A:
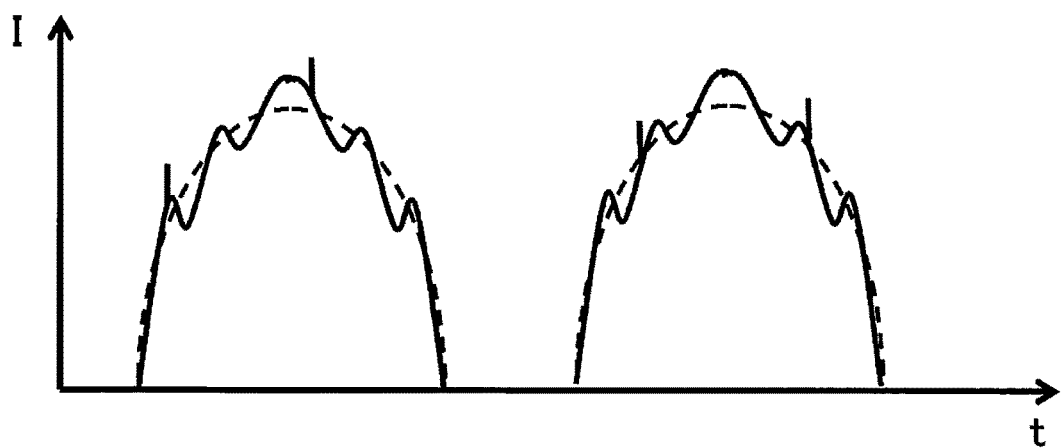
FIG. 6A is an explanatory diagram showing changes over time in a current flowing to an inverter circuit of an electric circular saw in a comparative example.
Figure 6B:
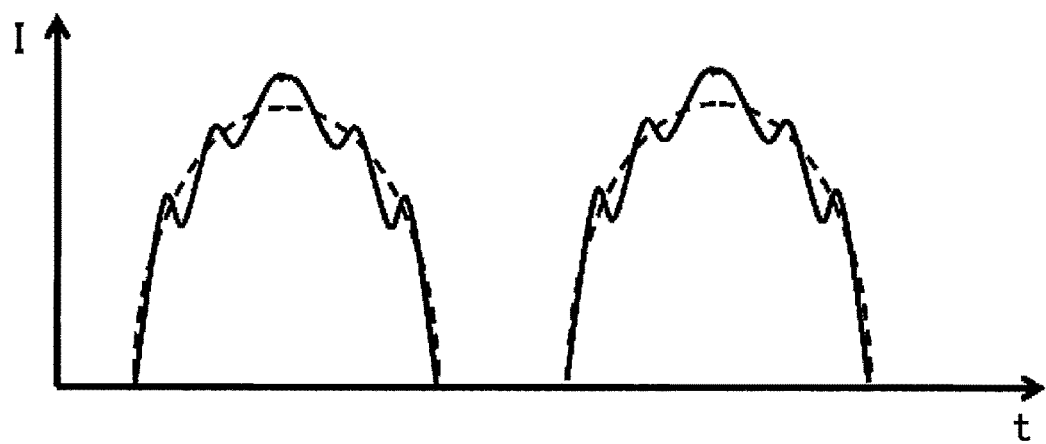
FIG. 6B is an explanatory diagram showing changes over time in a current flowing to an inverter circuit of an electric circular saw according to the first embodiment.

Next, the current I flowing to the inverter circuit will be described in greater detail with reference to FIGS. 6A and 6B. FIGS. 6A and 6B are explanatory diagrams showing the change over time in the current I flowing to the inverter circuit. FIG. 6A corresponds to an electric circular saw in a comparative example, and FIG. 6B corresponds to the electric circular saw 100 according to the embodiment. In both FIGS. 6A and 6B, the vertical axis represents the current I flowing to the inverter circuit, and the horizontal axis represents time t.

In the electric circular saw of the comparative example, a single electrolytic capacitor is provided in the smoothing circuit as a smoothing capacitor. The smoothing circuit smoothes the output from the rectifier circuit and inputs the smoothed output into the inverter circuit. If the electrolytic capacitor used in this case is compact with a small capacitance, the output from the rectifier circuit is not completely smoothed, and the electric circular saw is similar to the electric circular saw 100 of the embodiment described above in that a pulsating voltage is inputted into the inverter circuit.

In this case, the current I flowing to the inverter circuit takes on values macroscopically similar in shape to the waveform of the pulsating voltage V in the periods $T_1$, as illustrated by the dashed line in FIG. 6A. However, the current I changes microscopically in short periods, as illustrated by the solid line in FIG. 6A.

Since electrolytic capacitors have a large capacitance for their size and low impedance in the low frequency range, the electrolytic capacitor can smooth the output from the rectifier circuit better than a film capacitor of the same size, for example. In other words, the electrolytic capacitor macroscopically smoothes the current waveform of the utility frequency.

However, electrolytic capacitors have a high internal parasitic resistance and high impedance in the high frequency range. Accordingly, electrolytic capacitors have a poor ability to absorb the high frequency component, making it difficult to smooth instantaneous surge currents generated as a result of the operating state of the dynamo, which is the power supply, and power conditions. Therefore, the current I flowing to the inverter circuit in the electric circular saw of the comparative example includes instantaneous surge currents, as illustrated by the solid line in FIG. 6A.

In the electric circular saw 100 according to the present embodiment, on the other hand, the smoothing circuit 92 is provided with the film capacitor 922 in addition to the electrolytic capacitor 921. The film capacitor 922 has an extremely small capacitance and high impedance in the low frequency range. Therefore, when comparing the waveforms indicated by dashed lines in FIGS. 6A and 6B, there is almost no change in the overall macroscopic current waveform having the utility frequency as a result of introducing the film capacitor 922.

However, the film capacitor 922 has low impedance properties in the high frequency range. Accordingly, the film capacitor 922 performs well in absorbing the high frequency component and can thereby smooth the instantaneous surge currents produced in FIG. 6A, as illustrated by the solid line in FIG. 6B. Therefore, the electric circular saw 100 according to the present embodiment suppresses peak currents caused by surge currents in the current I flowing to the inverter circuit 93 better than the conventional electric circular saw.

It is known that inrush currents are often generated in electric circular saws immediately after the circular saw is switched on and the motor is started. An inrush current in this case is a peak current at a high frequency having a very large current value. A similar peak current may also be generated when the current value rises sharply at the peak of the waveform for the utility frequency. As with inrush currents, surge currents occurring unexpectedly when using a dynamo as the power supply are peak currents having high frequencies and very large current values. By providing the film capacitor 922 in the smoothing circuit 92 in addition to the electrolytic capacitor 921, the electric circular saw 100 according to the present embodiment can smooth electric current at high frequencies, thereby effectively suppressing peak currents.

Further, in the electric circular saw 100 according to the present embodiment, the switch 924 is disposed between the electrolytic capacitor 921 and film capacitor 922, as illustrated in FIG. 3. With this arrangement, the electrolytic capacitor 921 is disposed between the rectifier circuit 91 and switch 924, and the film capacitor 922 is disposed between the switch 924 and inverter circuit 93.

Therefore, even if the output from the rectifier circuit 91 becomes large when the switch 924 is switched on to start the motor 1, the output current from the rectifier circuit 91 is not inputted directly into the switch 924, but first passes through the electrolytic capacitor 921. Hence, the electrolytic capacitor 921 can prevent contacts of the switch 924 from becoming welded, as well as the occurrence of other problems.

Further, energy stored in the windings U, V, and W is applied to the inverter circuit 93 when the switch 924 is switched off. However, in the electric circular saw 100 according to the present embodiment, the film capacitor 922 is arranged to remain connected to the inverter circuit 93 even when the switch 924 is off. Accordingly, the film capacitor 922 absorbs this energy, thereby suppressing damage to the switching elements Q1-Q6.

In other words, when the switch 924 is switched off as the operation of the trigger 3a is released, the electric circular saw 100 according to the present embodiment is configured to reliably halt the drive of the motor 1 irrespective of a command from the control unit 9. In this way, a structure can be implemented for improving the service life of the switch 924 and inverter circuit 93.

As described above for the electric circular saw 100 according to the first embodiment, two small capacitors having different properties, i.e., the electrolytic capacitor 921 and film capacitor 922, are provided in the smoothing circuit 92. Accordingly, the electric circular saw 100 can efficiently suppress peak currents without possessing a large smoothing capacitor with a large capacitance. Hence, the present invention can realize a compact electric circular saw 100 with good operability.

Further, by disposing the switch 924 between the electrolytic capacitor 921 and film capacitor 922, the present invention can prevent welding of the switch 924 and can thereby suppress damage to the switching elements Q1-Q6 mounted on the inverter circuit 93. Accordingly, the service life of the electric circular saw 100 is improved.

Next, an electric circular saw 200 according to a second embodiment will be described. The electric circular saw 200 according to the second embodiment differs from the electric circular saw 100 in the first embodiment in that a smoothing circuit 292 is provided with two film capacitors 925 and 926. Note that identical or equivalent components, members, and the like with those of the first embodiment are designated with the same reference numerals, and duplicative descriptions are omitted as appropriate.

Figure 7:
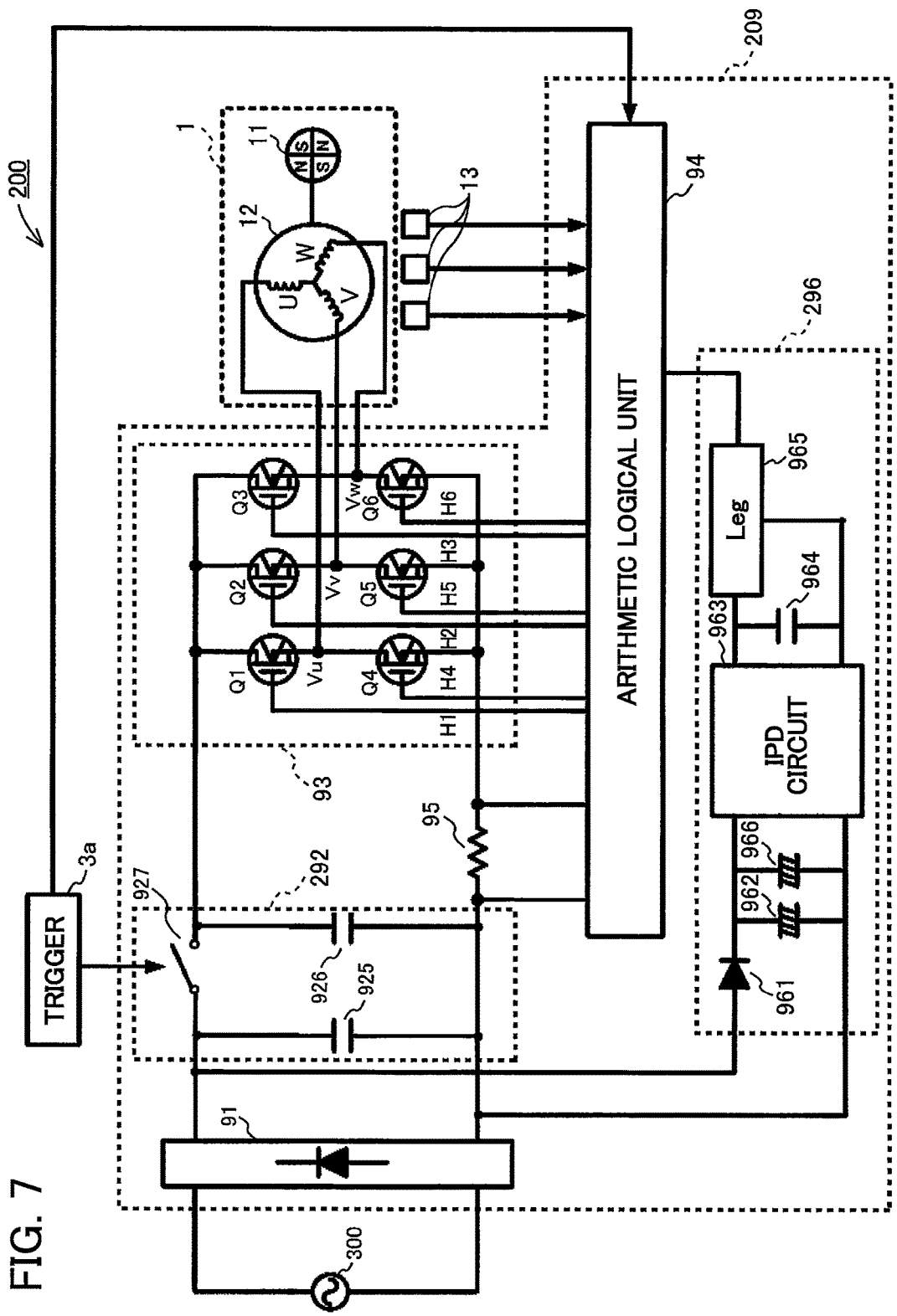
FIG. 7 is a circuit diagram showing an electrical structure of an electric circular saw 200 according to a second embodiment.

FIG. 7 is a circuit diagram showing the electrical structure of the electric circular saw 200 according to the second embodiment. As shown in FIG. 7, the electric circular saw 200 is configured to include the motor 1, the trigger 3a, and a control unit 209.

As shown in FIG. 7, the control unit 209 includes the rectifier circuit 91, a smoothing circuit 292, the inverter circuit 93, the arithmetic logical unit 94, the current detecting resistor 95, and a constant-voltage power supply circuit 296. Of these, the rectifier circuit 91, inverter circuit 93, arithmetic logical unit 94, and constant-voltage power supply circuit 296 are mounted on the control board 8.

As shown in FIG. 7, the smoothing circuit 292 is disposed between the rectifier circuit 91 and inverter circuit 93. The smoothing circuit 292 smoothes voltage inputted from the rectifier circuit 91 and outputs the resulting voltage to the inverter circuit 93. In the present embodiment, the smoothing circuit 292 includes a film capacitor 925, a film capacitor 926, and a switch 927.

The film capacitors 925 and 926 are non-polarized capacitors. As shown in FIG. 7, the film capacitors 925 and 926 are connected in parallel to each other, with the film capacitor 925 connected to the side of the smoothing circuit 292 receiving input from the rectifier circuit 91 while the film capacitor 926 is connected to the side providing output to the inverter circuit 93. In the second embodiment, the film capacitors 925 and 926 are small capacitors with a capacitance of 4.7 µF.

As in the first embodiment, the film capacitors 925 and 926 are disposed in the space between the control board 8 and the front part of the circuit board accommodating section 2b and are connected to the control board 8. At this time, the film capacitors 925 and 926 are positioned within the planar dimensions of the control board 8. Further, the height dimensions of the film capacitors 925 and 926 (the dimensions in the front-rear direction of the electric circular saw 200) are approximately equivalent to the protruding lengths of circuit elements that protrude from the control board 8.

The switch 927 is disposed between the film capacitor 925 and film capacitor 926. The switch 927 is toggled on when a start signal is inputted from the trigger 3a, and is toggled off when input of the start signal is halted. As in the first embodiment, the switch 927 is accommodated inside the handle 3.

As shown in FIG. 7, the constant-voltage power supply circuit 296 is connected to the output side of the rectifier circuit 91. The constant-voltage power supply circuit 296 includes the diode 961, the capacitor 962, a capacitor 966, the IPD circuit 963, the capacitor 964, and the regulator 965. The constant-voltage power supply circuit 296 serves to supply a stable reference voltage to the arithmetic logical unit 94 and the like on the basis of the output from the rectifier circuit 91.

In the electric circular saw 200 having the structure described above, the smoothing circuit 292 is provided with only the two film capacitors 925 and 926 having small capacitances. Therefore, as in the first embodiment, the smoothing circuit 292 does not completely smooth the voltage inputted from the rectifier circuit 91, outputting a pulsating voltage V having a minimum value smaller than the induced voltage $V_1$ generated in the windings of the motor 1. In this case, the pulsating voltage V has the utility frequency of the commercial AC power supply 300. Further, while current flows to the inverter circuit 93 and motor 1 during periods $T_1$ in which the value of the pulsating voltage V is greater than the induced voltage $V_1$, current does not flow during periods $T_2$ in which the value of the pulsating voltage V is less than or equal to the induced voltage $V_1$. Hence, the current I flowing to the inverter circuit 93 is, macroscopically, a pulsating current having the utility frequency of the commercial AC power supply 300.

While the two film capacitors 925 and 926 provided in the smoothing circuit 292 have small capacitances in this example, they have low impedance in the high frequency range and, therefore, perform well in absorbing the high frequency component. Accordingly, the smoothing circuit 292 smoothes instantaneous surge currents. Hence, in the electric circular saw 200 according to the second embodiment, the smoothing circuit 292 can suppress the occurrence of peak currents.

Further, the switch 927 is disposed in the smoothing circuit 292 between the two film capacitors 925 and 926. With this arrangement, the film capacitor 925 is disposed between the rectifier circuit 91 and switch 927, and the film capacitor 926 is disposed between the switch 927 and inverter circuit 93.

Therefore, even if an inrush current is outputted from the rectifier circuit 91 when the switch 927 is switched on to start the motor 1, the output current from the rectifier circuit 91 is not inputted directly into the switch 927, but first passes through the film capacitor 925. Accordingly, the film capacitor 925 can absorb the inrush current and can thereby prevent contacts of the switch 927 from becoming welded, as well as the occurrence of other problems.

Further, since the film capacitor 926 is arranged to remain connected to the inverter circuit 93 even when the switch 927 is off, the film capacitor 926 absorbs energy stored in the windings U, V, and W, thereby suppressing damage to the switching elements Q1-Q6.

In the electric circular saw 200 according to the second embodiment described above, two small film capacitors 925 and 926 are provided in the smoothing circuit 292. Accordingly, the electric circular saw 200 can suppress peak currents without possessing a large smoothing capacitor with a large capacitance. Hence, the present invention can realize a compact electric circular saw 200 with good operability.

Further, by disposing the switch 927 between the film capacitors 925 and 926, the present invention can prevent welding of the switch 927 and can thereby suppress damage to the switching elements Q1-Q6 mounted on the inverter circuit 93. Accordingly, the service life of the electric circular saw 200 is improved.

While the invention has been described in detail with reference to specific embodiments thereof, it would be apparent to those skilled in the art that various changes and modifications may be made therein without departing from the spirit and scope of the invention.

REFERENCE SIGNS LIST

1: motor, 3a: trigger, 8: control board, 91: rectifier circuit; 92, 292: smoothing circuit, 93: inverter circuit, 94: arithmetic logical unit, 100, 200: electric circular saw, 921: electrolytic capacitor, 922: film capacitor, 924, 927: switch, 925, 926: film capacitor

The invention claimed is:

1. A power tool comprising:
a brushless motor;
a rectifier circuit configured to rectify an AC voltage and output a rectified voltage;
a smoothing circuit configured to smooth the rectified voltage and output a smoothed voltage;
an inverter circuit configured to supply the smoothed voltage to the brushless motor while performing switching actions with respect to the smoothed voltage;
a controller configured to control switching operations of the inverter circuit;
an operating part being operable by a user; and
a switch rendered ON in accordance with an operation performed in the operating part by the user to allow power to be supplied to the inverter circuit by the rectifier circuit through the smoothing circuit and rendered OFF in accordance with release of the operation by the user to interrupt the inverter circuit from the rectifier circuit to halt supplying the power to the inverter circuit,
wherein the smoothing circuit comprises a first capacitor and a second capacitor connected in parallel,
wherein the switch is interposed between the rectifier circuit and the inverter circuit and is interposed between the first capacitor and the inverter circuit, and
wherein the controller is configured to control the switching operations of the inverter circuit to drive the brushless motor in accordance with a signal inputted in accordance with the operation performed in the operating part by the user.

2. The power tool according to claim 1, wherein the first capacitor is a polarized capacitor and the second capacitor is a non-polarized capacitor.

3. The power tool according to claim 2, wherein the polarized capacitor is an electrolytic capacitor, and the non-polarized capacitor is a film capacitor.

4. The power tool according to claim 1, wherein the first capacitor has a capacity larger than a capacity of the second capacitor.

5. The power tool according to claim 1, wherein the brushless motor has stator windings from which an induced voltage is generated, and
wherein the smoothing circuit outputs a pulsating voltage having a minimum value smaller than the induced voltage.

6. The power tool according to claim 1, wherein the switch is interposed between the first capacitor and the second capacitor, and
wherein the second capacitor is interposed between the switch and the inverter circuit.

7. The power tool according to claim 1, further comprising:
a signal outputting part configured to output an ON signal to the controller in accordance with the operation performed in the operating part by the user and to output an OFF signal to the controller in accordance with release of the operation performed in the operating part by the user.

8. The power tool according to claim 1, wherein when the controller determines that a current value flowing in the brushless motor exceeds a threshold value, the controller controls the inverter circuit to stop the switching operations regardless of the operations performed in the operating part.

9. The power tool according to claim 1, further comprising a circuit board on which mounted are circuit elements including the rectifier circuit, the smoothing circuit, and the inverter circuit, the circuit board having planar dimensions, the circuit elements having heights,
wherein the first capacitor and the second capacitor are electrically connected to the circuit board, positioned within planar dimensions of the circuit board, and have heights substantially equivalent to the heights of the circuit elements.

10. The power tool according to claim 1, wherein the first capacitor and the second capacitor are film capacitors.

11. The power tool according to claim 1, wherein the first capacitor and the second capacitor have different impedance.

12. A power tool comprising:
a brushless motor;
a rectifier circuit configured to rectify an AC voltage and output a rectified voltage;
a smoothing circuit configured to smooth the rectified voltage and output a smoothed voltage;
an inverter circuit configured to supply the smoothed voltage to the brushless motor while performing switching actions with respect to the smoothed voltage;
a controller configured to control switching operations of the inverter circuit;
an operating part being operable by a user; and
a switch rendered ON in accordance with an operation performed in the operating part by the user to allow power to be supplied to the inverter circuit by the rectifier circuit through the smoothing circuit and rendered OFF in accordance with release of the operation by the user to interrupt the inverter circuit from the rectifier circuit to halt supplying the power to the inverter circuit, wherein the smoothing circuit comprises a first capacitor and a second capacitor connected in parallel, and wherein the switch is interposed between the rectifier circuit and the inverter circuit and is interposed between the first capacitor and the inverter circuit.

13. A power tool comprising:

a brushless motor;

a rectifier circuit configured to rectify an AC voltage supplied from an AC power supply and output a rectified voltage;

an inverter circuit configured to perform switching actions with respect to the rectified voltage to be supplied to the brushless motor;

a controller configured to control the switching actions of the inverter circuit;

a trigger having an operating part being operable by a user;

a switch rendered ON and OFF in accordance with an operation performed in the operating part, wherein when the switch is ON, the inverter circuit is electrically connected to the AC power supply whereas when the switch is OFF, the inverter circuit is electrically disconnected from the AC power supply; and a power supply circuit connected between the switch and the AC power supply and is configured to supply a voltage to the controller.

14. The power tool according to claim 13, wherein the trigger includes a signal output part configured to output a start signal to the controller in response to the operation of the operating part for rendering the switch ON.

15. The power tool according to claim 14, wherein the controller is configured to control the inverter circuit in response to the start signal.

16. The power tool according to claim 13, further comprising a capacitor connected between the switch and the rectifier circuit, wherein the switch is connected between the rectifier circuit and the inverter circuit.

17. The power tool according to claim 13, further comprising a capacitor connected between the switch and the inverter circuit, wherein the switch is connected between the rectifier circuit and the inverter circuit.

18. The power tool according to claim 13, further comprising a pair of capacitors connected in parallel, the pair of capacitors being connected between the AC power supply and the inverter circuit, each of the pair of capacitors being connected in parallel with both of the AC power supply and the inverter circuit, wherein the switch is connected between the pair of capacitors and is connected in series with the AC power supply and the inverter circuit.

19. The power tool according to claim 13, further comprising a handle being graspable by the user and supporting the operating part, wherein the operating part directly changes over the switch from ON to OFF and vice versa.

* * * * *